(12) United States Patent
Goberti et al.

(10) Patent No.: US 9,029,455 B2
(45) Date of Patent: May 12, 2015

(54) SOFT POLYOLEFIN COMPOSITIONS WITH IMPROVED PROCESSABILITY

(75) Inventors: Paolo Goberti, Vigarano Mainarda (IT); Johan De Clippeleir, Oud Heverlee (BE); Giampaolo Pellegatti, Boara (IT); Friederike Morhard, Köln-Sürth (DE); Stefano Spataro, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 324 days.

(21) Appl. No.: 12/733,301

(22) PCT Filed: Jul. 29, 2008

(86) PCT No.: PCT/EP2008/059906
§ 371 (c)(1),
(2), (4) Date: Feb. 22, 2010

(87) PCT Pub. No.: WO2009/024435
PCT Pub. Date: Feb. 26, 2009

(65) Prior Publication Data
US 2010/0174029 A1    Jul. 8, 2010

Related U.S. Application Data

(60) Provisional application No. 60/965,925, filed on Aug. 23, 2007.

(30) Foreign Application Priority Data

Aug. 22, 2007 (EP) .................................. 07114770

(51) Int. Cl.
| | |
|---|---|
| *C08K 5/01* | (2006.01) |
| *C08L 23/10* | (2006.01) |
| *C08L 23/08* | (2006.01) |
| *C08L 23/16* | (2006.01) |
| C08K 5/00 | (2006.01) |
| C08L 23/20 | (2006.01) |

(52) U.S. Cl.
CPC ............. *C08L 23/10* (2013.01); *C08L 23/0807* (2013.01); *C08L 23/16* (2013.01); C08K 5/0016 (2013.01); *C08L 23/20* (2013.01)

(58) Field of Classification Search
USPC ........................................ 524/474, 476, 477
See application file for complete search history.

(56) References Cited

U.S. PATENT DOCUMENTS

| | | | | |
|---|---|---|---|---|
| 3,322,708 | A | * | 5/1967 | Wilson .......................... 524/488 |
| 5,238,635 | A | * | 8/1993 | Launchbury et al. ......... 264/211 |
| 6,180,720 | B1 | * | 1/2001 | Collina et al. ................. 525/191 |
| 6,277,918 | B1 | | 8/2001 | Collina et al. |
| 6,667,364 | B2 | * | 12/2003 | Abraham et al. .............. 524/505 |
| 2002/0137835 | A1 | | 9/2002 | Abraham et al. |
| 2004/0198919 | A1 | * | 10/2004 | Pelliconi et al. ........... 525/333.7 |
| 2007/0203273 | A1 | | 8/2007 | Van Riel et al. |

FOREIGN PATENT DOCUMENTS

| | | | |
|---|---|---|---|
| EP | 218332 | A    * | 4/1987 |
| JP | 2000515582 | | 11/2000 |
| WO | WO2006098142 | | 9/2006 |

OTHER PUBLICATIONS

MSDS of Polytac R-500 from Crowley Chemical Company.*
Japanese Office Action—Mailed Aug. 15, 2012—for Corresponding Application No. 2010-521377.

* cited by examiner

*Primary Examiner* — Wenwen Cai

(57) ABSTRACT

Soft polyolefin composition with improved processability comprising from 8 to 45% by weight of a polypropylene component (A), from 82 to 45% by weight of an elastomeric component (B), and from 10 to 25% by weight of a viscosity reducing agent (C) comprising polybutene-1 and paraffinic wax or grease. The composition is easily processable also by injection molding and has better tensile properties than compositions in which processability is improved by visbreaking.

6 Claims, No Drawings

SOFT POLYOLEFIN COMPOSITIONS WITH IMPROVED PROCESSABILITY

CROSS-REFERENCE TO RELATED APPLICATIONS

This application is the U.S. national phase of International Application PCT/EP2008/059906, filed Jul. 29, 2008, claiming priority to European Patent Application 07114770.6 filed Aug. 22, 2007, and the benefit under 35 U.S.C. 119(e) of U.S. Provisional Application No. 60/965,925, filed Aug. 23, 2007; the disclosures of International Application PCT/EP2008/059906, European Patent Application 07114770.6 and U.S. Provisional Application No. 60/965,925, each as filed, are incorporated herein by reference.

BACKGROUND OF THE INVENTION

The present invention relates to soft polyolefin compositions with improved processability. More particularly, the invention relates to soft heterophasic polyolefin compositions with improved processability obtained by addition of certain processing aids.

Soft polyolefin compositions can be obtained by blending a crystalline thermoplastic fraction with an elastomeric fraction. Typically, such compositions are heterophasic since the crystalline fraction constitutes a matrix in which the elastomeric phase is finely dispersed.

Soft heterophasic polyolefin compositions can be obtained by a variety of processes, including sequential polymerisation in multiple reactors producing in-reactor blends.

Soft polyolefin compositions having elastic properties but still retaining a thermoplastic behaviour are used in many applications since they can be transformed into shaped articles by the same fabrication processes used for thermoplastic polymers, including extrusion processes and injection moulding.

Soft polyolefin compositions in which the crystalline fraction comprises a substantial amount of a propylene homopolymer or a random copolymer of propylene with ethylene and or another α-olefin, and the elastomeric fraction comprises a substantial amount of an elastomeric ethylene-propylene copolymer, optionally containing a diene (EPDM), can advantageously be prepared by sequential polymerisation in at least two reactors in the presence of a Ziegler/Natta or a metallocene catalyst system, as described for example in WO 03/011962.

Compositions comprising a substantial amount of an elastomeric fraction having a high intrinsic viscosity, however, may be difficult to process in the molten state due to a very low melt flow rate (MFR), often below 1 (230° C., 2.16 kg, ASTM D 1238, Condition L). Generally, a widely used technique to increase the MFR of a polyolefin material is visbreaking.

The process of visbreaking a polyolefin material is well known to those skilled in the art. Generally, it is carried out by using a peroxide in liquid or powder form or absorbed on a carrier. The polyolefin composition/peroxide mixture is then introduced into a means for thermally plasticizing and conveying the mixture, e.g., an extruder at elevated temperature. Residence time and temperature are controlled in relation to the particular peroxide selected (i.e., based on the half-life of the peroxide at the process temperature of the extruder) so as to effect the desired degree of polymer chain degradation. The net result is to narrow the molecular weight distribution of the polymers present in the composition, as well as to reduce the overall molecular weight and thereby increase the MFR relative to the as-polymerized polymer. For example, a polymer with a fractional MFR (i.e., less than 1), or a polymer with a MFR of 0.5-10, can be selectively visbroken to a MFR of 15-50 by selection of peroxide type, extruder temperature and extruder residence time. Sufficient care should be exercised in the practice of the procedure to avoid cross-linking in the presence of an ethylene-containing copolymer. Peroxide visbreaking, however, results often in sticky materials and in worsening of mechanical properties. Therefore, improved processability obtained by visbreaking suffers the big disadvantage of a lower quality of the polyolefin composition.

Use of melt viscosity reducing agents instead of visbreaking to improve processability of certain polyolefin materials is disclosed in the patent literature.

U.S. Pat. No. 6,277,918 B1 discloses the use of crystalline polybutene-1 with polyolefin compositions comprising a substantial amount (above 75% by weight) of an ethylene copolymer of the LLDPE type.

U.S. Pat. No. 6,667,364 B2 discloses the use of a melt viscosity reducer to improve the processability of PE-rich TPV ("thermoplastic vulcanizates") in which PE is the continuous hard phase and a particular EPDM rubber is the soft phase. Viscosity reducers disclosed in this patent include isotactic poly(1-butene) and certain oils or waxes. The high viscosity of these compositions is attributable to the compatibility of PE with EPDM rubber. A TPV in which either PP or the rubber is present in a larger amount than the other is deemed to be processable (column 2, lines 51-55).

BRIEF SUMMARY OF THE INVENTION

The cited documents do not offer a solution to the poor processability in the molten state of soft polyolefin compositions comprising essentially a crystalline propylene (co)polymer and a substantial amount of an ethylene-propylene elastomeric copolymer component.

Thus, the need is felt for soft polyolefin compositions with improved processability in which an increase in the melt flow rate is achieved without worsening the mechanical properties and/or causing undesired effects such as stickiness or migration of oils used as viscosity reducers to the surface of the finished article ("blooming").

Therefore the present invention relates to a soft polyolefin composition having MFR equal to or higher than 1, preferably equal to or higher than 2, comprising:

(A) from 8 to 45% by weight of a polypropylene component comprising a propylene homopolymer or a propylene copolymer with another α-olefin, said polypropylene component containing at least 85% by weight of propylene, and having a solubility in xylene at room temperature lower than 20% by weight;

(B) from 82 to 45% by weight of an elastomeric component comprising a copolymer or a composition of copolymers of ethylene with at least one other α-olefin, containing from 15% by weight to 40% by weight of ethylene, said rubber having a solubility in xylene at room temperature greater than 60% by weight;

(C) from 10 to 25% by weight of a viscosity reducing agent comprising an homo or copolymer of butene-1 and a paraffinic wax or grease.

DETAILED DESCRIPTION OF THE INVENTION

The soft polyolefin compositions of the invention exhibit low flexural modulus values, i.e. lower than 100 MPa, preferably lower than 60 MPa, more preferably lower than 30 Mpa, at the same time retaining the mechanical and optical properties of less flexible compositions. The soft polyolefin compositions of the invention comprise from 8 to 45% by weight, preferably from 10 to 30%, more preferably from 12 to 18% of polypropylene component (A); from 82 to 45% by weight, preferably from 80 to 60%, more preferably from 78 to 72% of elastomeric component (B); and from 10 to 25% by weight, preferably from 12 to 20, more preferably from 14 to 16, of a viscosity reducing agent comprising an homo or copolymer of butene-1 and a paraffinic wax or grease.

The polypropylene component (A) of the compositions of the invention is (i) a crystalline propylene homopolymer or (ii) a crystalline copolymer of propylene with at least one α-olefin of formula $H_2CH=CHR$, where R is H or a $C_{2-6}$ linear or branched alkyl.

By "crystalline" is meant herein a polymer having high cristallinity, and having a solubility in xylene at room temperature lower than 20% by weight.

The homopolymer (i) has a preferred solubility in xylene at room temperature lower than 10% by weight, preferably lower than 5%, and even more preferably lower than 3%. By "room temperature" is meant herein a temperature of about 25° C.

The copolymer of propylene (ii) contains at least 85% by weight of propylene, preferably at least 90% propylene, and has a preferred solubility in xylene at room temperature lower than 15% by weight, preferably lower than 10%, and even more preferably lower than 8%. Said α-olefin is preferably ethylene, butene-1, pentene-1,4-methylpentene, hexene-1, octene-1 or any combinations thereof, and even more preferably the copolymer of propylene (ii) is a copolymer of propylene and ethylene.

Copolymers of propylene with ethylene or with another α-olefin or a combination thereof are preferred (A) components, because they confer high transparency to the compositions of the invention.

The elastomeric component (B) of the polyolefin compositions of the invention comprises a copolymer or a composition of copolymers of ethylene with propylene and/or at least one other α-olefin, containing from 15% by weight to 40% by weight of ethylene, said elastomeric component having a solubility in xylene at room temperature greater than 60% by weight.

Said elastomeric component preferably comprises a first elastomeric copolymer (1) and a second elastomeric copolymer (2).

By "elastomeric" is meant herein a polymer having low cristallinity or being amorphous, and having a solubility in xylene at room temperature greater than 60% by weight.

The first elastomeric copolymer (1) is a copolymer of ethylene with propylene and/or at least one C4-C10 α-olefin, optionally containing 0.5 to 5% by weight of a diene; said C4-C10 α-olefin is preferably butene-1, hexene-1 or octene-1. The ethylene content ranges from 15 to 32% by weight, preferably from 25 to 30%. The elastomeric copolymer (1) has a solubility in xylene at room temperature greater than 50% by weight, preferably greater than 70%, and even more preferably greater than 80%; the intrinsic viscosity of the xylene soluble fraction ranges from 3.0 to 5.0 dl/g, more preferably from 3.5 to 4.5 dl/g, and even more preferably from 3.8 to 4.3 dl/g. The second elastomeric copolymer (2) is a copolymer of ethylene with propylene and/or at least one C4-C10 α-olefin, optionally containing 0.5 to 5% by weight of a diene; said C4-C10 α-olefin is preferably butene-1, hexene-1 or octene-1. The ethylene content is greater than 32% up to 45% by weight, and preferably ranges from 35 to 40%. The elastomeric copolymer (2) has solubility in xylene at room temperature greater than 80% by weight, preferably greater than 85%, and the intrinsic viscosity of the xylene soluble fraction ranges from 4.0 to 6.5 dl/g, preferably from 4.5 to 6.0, and more preferably from 5.0 to 5.7 dl/g. As previously reported, the copolymerization of ethylene and propylene and/or another α-olefin or combinations thereof, to form the copolymers (1) and (2) of the elastomeric fraction (B) can occur in the presence of a diene, conjugated or not, such as butadiene, 1,4-hexadiene, 1,5-hexadiene and ethylidene-norbornene-1. The diene, when present, is in an amount of from 0.5 to 5% by weight, with respect to the weight of the fraction (B).

The weight ratio of the elastomeric copolymers (1)/(2) ranges from 1:5 to 5:1. Typically, the polyolefin composition of the invention has a flexural modulus lower than 100 MPa, preferably lower than 60 Mpa, more preferably lower than 30 MPa; a Shore A hardness lower than 90, preferably from 65 to 80; and tension set at 100% lower than 60%, preferably lower than 50%.

The soft polyolefin composition of the invention can be prepared by blending the polypropylene component (A) and the elastomeric component (B) of the soft polyolefin composition of the invention or by sequential polymerisation in at least two stages. According to a preferred embodiment, a sequential polymerisation is carried out in the presence of a catalyst system comprising a trialkylaluminum compound, optionally an electron donor, and a solid catalyst component comprising a halide or halogen-alcoholate of Ti and an electron-donor compound supported on anhydrous magnesium chloride, as described for example in WO 03/011962.

The polypropylene component (A) and the elastomeric component (B) alone, namely without the addition of any processing aids, for example when obtained as in-reactor blend from the sequential polymerisation process mentioned above, have a very low MFR, typically a fractional MFR, and are not easily processable in the molten state, particularly for applications requiring injection moulding.

According to the invention, they can be blended with the viscosity reducing agent (C) as such, namely as polymerised, including any finishing treatment, or can be subjected to a limited visbreaking prior to blending with the viscosity reducing agent (C), to achieve a partial increase of the MFR.

The viscosity reducing agent (C) of the present invention comprises a crystalline poly-1-butene component and a paraffinic wax or grease component.

Polybutene-1 polymers are well known in the art, particularly for their good properties in terms of pressure resistance and creep resistance. Polybutene-1 polymers are generally prepared by polymerizing butene-1 in the presence of certain Ziegler/Natta catalyst systems. Preferably the polybutene-1 employed as a component of the viscosity reducing agent according to the present invention is a linear homopolymer that is semicrystalline and highly isotactic (having in particular an isotacticity from 96 to 99%, measured both as mmmm pentads/total pentads using NMR, and as quantity by weight of matter soluble in xylene at 0° C.), obtained by polymerization of butene-1 with a stereospecific catalyst, as described in the literature. Preferably the polybutene-1 polymer used in the soft polyolefin compositions of the present invention has a melting point of crystalline form 2 (the first to form, being favoured kinetically) from 81 to 109° C.

Suitable polymers of butene-1 are both the homopolymers and the copolymers preferably containing up to 30 mol. % of olefinic comonomers (in particular ethylene and alpha-olefins containing from 5 to 8 carbon atoms). These polymers can be obtained, for example, by low-pressure Ziegler-Natta polymerization of butene-1, for example by polymerizing butene-1 (and any comonomers) with catalysts based on $TiCl_3$, or halogenated compounds of titanium supported on magnesium chloride, and suitable co-catalysts (in particular alkyl compounds of aluminum). High values of melt flow rate can be obtained by successive treatment of the polymer with peroxides. Polybutene-1 with a MFR above 100 is preferred for the compositions of the present invention.

A Polybutene-1 homopolymer or copolymer having a melt flow rate of from 100 to 500 g/10 min at 190° C./2.16 kg is particularly preferred for use in the present invention.

The paraffinic wax or grease component of the viscosity reducing agent of the present invention is a solid or semi-solid mixture of hydrocarbons, known also as vaseline grease. It is a hydrophobic, highly viscous grease normally solid or semi-solid at ambient temperature, with a melting point typically above 50° C.

The polybutene-1 component and the paraffinic wax or grease component are present in the viscosity reducing agent (C) in a ratio from 5:1 to 1:5, preferably from 2:1 to 1:2.

The soft polyolefin compositions of the present invention find application in a variety of fields, including medical, automotive, packaging, consumer. Use of the compositions of the invention in applications in which finished articles are fabricated by injection molding is particularly advantageous.

Conventional additives, fillers and pigments, usually used in olefin polymers, may be added, such as nucleating agents, extension oils, mineral fillers, and other organic and inorganic pigments.

EXAMPLES

Unless otherwise stated, the following test methods were used to determine the properties reported in the detailed description and in the examples.

| PROPERTY | METHOD |
| --- | --- |
| Melt flow rate | ISO 1133 (Condition "L") |
| Tension set at 100% | ASTM D412 |
| Tensile strength at break | ISO 527 (with S-type test specimens tested at 500 mm/min) |
| Elongation at break | ISO 527 |
| Flexural modulus at 23° C. | ISO 178 |
| Shore hardness A | ISO 868 (measured after 5 sec) |

Unless otherwise specified, the samples to be subjected to the various physical-mechanical analyses were prepared according to ISO 8986-2. 120×120×2 mm thick plaques were obtained by compression molding (at 200° C. with a cooling of 30° C./min) of a polymer composition obtained by mixing in a Brabender the relevant copolymer sample with 1% 2,6-di-t-butyl-4-methyl phenol (BHT) at 180° C.

Before testing the 2 mm thick plaques were put into an autoclave at 200 bars for 10 min at room temperature in order to accelerate the phase transformation of PB when present.

From these plaques, S-type samples were cut and submitted to tensile strength tests with a head speed of 500 mm/min. Also the specimens for the tension set, flexural modulus, and hardness Shore A were cut from these plaques. All the specimens were cut parallel to the advancement front and consequently perpendicular to the flow direction.

Spiral Flow Measurement Test

The spiral flow evaluation comprises injecting molten polymer into the center of a hollow spiral mold, and measuring the total length of solidified resin to determine how far the material will flow before it solidifies under specified conditions of pressure and temperature:

| Injection machine | SANDRETTO Series 7 190 |
| --- | --- |
| Clamping force | 190 ton |
| Screw diameter | 50 mm |
| Maximum volume of the injected polymer | 450 cc |
| Thickness of the spiral | 2.5 mm |
| Width of the spiral | 12.7 mm |
| Melting temperature | 200° C. |
| Mold Temperature | 40° C. |
| Total cycle time | 31 seconds |
| Cooling time | 20 seconds |

The spiral flow measurements were taken at several different pressures:

| Pressure Measured at Machine | Pressure Measured At Material |
| --- | --- |
| 60 bar | 600 bar |
| 100 bar | 1000 bar |

Note
the pressure of the SANDRETTO machine at 60 bar corresponds to 600 bar on the melt material.

Example 1

A polyolefin material having the composition of Example 3 of WO 03/011962 A1 was used to prepare a soft polyolefin composition according to the present invention. The polypropylene component (A) corresponds to the (co)polymer produced in the $1^{st}$ polymerisation stage of Table 1 of WO 03/011962 A1, and the elastomeric component (B) corresponds to the (co)polymer produced in the $2^{nd}$ and $3^{rd}$ polymerisation stages of Table 1 of WO 03/011962 A1. The amount of polypropylene component (A) on the total amount of (A+B) was of 15% by weight, and the amount of the elastomeric component (B) on the total amount of (A+B) was of 85% by weight. The composition as polymerised was subjected to visbreaking with peroxide (100 ppm Luperox 101) in a twin screw extruder Berstorff until a MFR 0.6 was reached.

A viscosity reducing agent (C) was prepared with
a polybutene-1 homopolymer having the physical properties reported below:

| PROPERTY | ASTM METHOD | VALUE |
| --- | --- | --- |
| Melt flow rate | D1238 | 175 g/10 min |
| Density | D1505 | 0.915 g/cm$^3$ |
| Tensile stress at break | D638 | 20 MPa |
| Flexural Elastic Modulus | D638 | 487 MPa |
| Melting range | DSC | 124-130° C.; and | a paraffinic wax or grease marketed under the name vaseline BF pharmaceutical grade petrolatum of CONQORD OIL s.r.l, solid at ambient temperature and having a melting point at 60° C.

A soft polyolefin composition was prepared with 85% by weight of (A+B) visbroken to a MFR 0.6 as said above, and 15% by weight of the viscosity reducing agent (C) in which the ratio polybutene-1:paraffinic wax or grease was of 1:2. The component (A+B) and the viscosity reducing agent (C) were introduced in a Brabender laboratory kneader and mixed. The properties of the soft composition so obtained are listed in Table 1.

Example 2

A composition as that of Example 1 was prepared, but with a viscosity reducing agent (C) in which the ratio of polybutene-1 to paraffinic wax or grease was 2:1.

Example 3

A composition as that of Example 1 was prepared, but with a viscosity reducing agent (C) in which the ratio of polybutene-1 to paraffinic wax or grease was 1:1.

Example 4

Comparative

A composition containing component A+B alone as obtained according to Example 3 of WO 03/011962 A1, peroxide visbroken to a MFR 0.6, without addition of any viscosity reducing agent, was tested for comparison purposes with examples 1-3 according to the invention.

Example 5

Comparative

A composition containing component A+B alone, as obtained according to Example 3 of WO 03/011962 A1, without any viscosity reducing agent, was visbroken with peroxide (100 ppm Luperox 101) in a twin screw extruder Berstorff until a MFR of 15 was achieved.

The final composition was tested for comparison purposes with examples 1-3 according to the invention.

Example 6

Comparative

A composition containing 85% by weight of A+B as obtained according to Example 3 of WO 03/011962 A1, peroxide visbroken to a MFR 0.6, was mixed with 15% of polybutene-1. The final composition was tested for comparison purposes with examples 1-3 according to the invention.

Example 7

Comparative

A composition containing 85% by weight of A+B as obtained according to Example 3 of WO 03/011962 A1, peroxide visbroken to a MFR 0.6, was mixed with 15% of the same vaseline BF pharmaceutical grade petrolatum of CONQORD OIL s.r.l. The final composition was tested for comparison purposes with examples 1-3 according to the invention.

The results are shown in Table 1 below.

TABLE 1

| | Ex. 1 | Ex. 2 | Ex. 3 | C. Ex. 4 | C. Ex. 5 | C. Ex. 6 | C. Ex. 7 |
|---|---|---|---|---|---|---|---|
| Composition (% by weight) | | | | | | | |
| Polyolefin A | 12.75 | 12.75 | 12.75 | 15 | 15 | 12.75 | 12.75 |
| Polyolefin B | 72.25 | 72.25 | 72.25 | 85 | 85 | 72.25 | 72.25 |
| A + B | 85 | 85 | 85 | 100 | 100 | 85 | 85 |
| Polybutene-1 | 5 | 10 | 7.5 | 0 | 0 | 15 | 0 |
| Paraffinic wax or grease | 10 | 5 | 7.5 | 0 | 0 | 0 | 15 |
| Property | | | | | | | |
| MFR | 2.2 | 2.2 | 2.3 | 0.6 | 15 | 2.7 | 1.6 |
| Tension set 100% | 42 | 48 | 44 | 42 | 39 | 45 | 34 |
| Flexural modulus | 10 | 19.3 | 13 | 16 | 17 | 30 | 15 |
| Stress @ break | 8.4 | 11.7 | 8.6 | 10.4 | 4.7 | 10.1 | 7 |
| Elongation @ break | 820 | 748 | 745 | 744 | 738 | 550 | 700 |
| Hardness Shore A | 69.2 | 75 | 70.6 | 76 | 76 | 78.2 | 63.2 |
| Spiral length 100 bar | 205 | 200 | 210 | 120 | 205 | 205 | 190 |
| Spiral length 60 bar | 120 | 120 | 130 | 60 | 143 | 120 | 100 |

The examples above show that a soft composition according to the invention (examples 1-3 compared to comp. ex. 4) allows to increase of the MFR from a fractional value to above 2, and the spiral length from 120 to above 200 at 100 bar, thereby substantially improving the processability of the composition in the molten state. Such improvement is obtained without significant worsening the mechanical properties of the composition. Also, softness measured via Shore A is enhanced.

Comparative example 5 shows that improvement of processability by visbreaking up to MFR 15 is associated to substantial worsening of mechanical properties, in particular worsening of flexibility, stress and elongation at break, without improving softness. Also, stickiness is typically associated to such a degree of visbreaking.

Comparative example 6 shows that polybutene-1 alone improve processability but hardness is worsen with respect to the base polymer composition.

Comparative example 7 shows that comparable amounts of paraffinic wax or grease alone do not produce the desired increase in MFR and spiral length values.

The invention claimed is:

1. A polyolefin composition comprising:
   (A) from 10 to 30% by weight of a polypropylene component comprising:
      (i) a propylene homopolymer or
      (ii) a propylene copolymer with another α-olefin,
      wherein the polypropylene component contains at least 85% by weight of propylene, and has a solubility in xylene at room temperature lower than 20% by weight;
   (B) from 60 to 80% by weight of an elastomeric component comprising:
      (i) a copolymer or a composition of copolymers of ethylene with propylene and/or at least one other α-olefin, containing from 15% by weight to 40% by weight of ethylene, the elastomeric component having a solubility in xylene at room temperature greater than 60% by weight; and
   (C) from 12 to 20% by weight of a viscosity reducing agent comprising:
      homo or copolymer of butene-1, wherein the homo or copolymer of butene-1 has a melt flow rate from 100 and 500 g/10 min at 190° C./2.16 kg, and
      a paraffinic wax or grease,
      wherein the polyolefin composition has a melt flow rate equal to or greater than 1 g/10 min at 230° C./2.16 kg; and, wherein the homo or copolymer of butene-1 and the paraffin wax or grease are present in the reducing agent at a weight ratio from 2:1 to 1:2.

2. The polyolefin composition according to claim 1, wherein the polyolefin composition has a melt flow rate equal to or greater than 2 g/10 min at 230° C./2.16 kg.

3. The polyolefin composition according to claim 1, wherein the homo or copolymer of butene-1 has a melt flow rate of 175 g/10 min at 190° C./2.16 kg.

4. The polyolefin composition according to claim 1, wherein a blend of the polypropylene component and the elastomeric component prior to the addition of the viscosity reducing agent has a fractional melt flow rate.

5. The polyolefin composition according to claim 1, wherein the paraffinic wax or grease has a melting point above 50° C.

6. An article comprising a polyolefin composition, wherein the article is fabricated by injection moulding, and wherein the polyolefin composition comprises:
- (A) from 10 to 30% by weight of a polypropylene component comprising a propylene homopolymer or a propylene copolymer with another α-olefin, the polypropylene component containing at least 85% by weight of propylene, and having a solubility in xylene at room temperature lower than 20% by weight;
- (B) from 60 to 80% by weight of an elastomeric component comprising a copolymer or a composition of copolymers of ethylene with propylene and/or at least one other α-olefin, containing from 15% by weight to 40% by weight of ethylene, the elastomeric component having a solubility in xylene at room temperature greater than 60% by weight; and
- (C) from 12 to 20% by weight of a viscosity reducing agent comprising a homo or copolymer of butene-1 and a paraffinic wax or grease, wherein the homo or copolymer of butene-1 has a melt flow rate from 100 to 500 g/10 min at 190° C./2.16 kg;
  wherein the homo or copolymer of butane-1 and said paraffin wax or grease are present in said reducing agent (C) at a weight ratio from 2:1 to 1:2, and
  wherein the polyolefin composition has a melt flow rate equal to or greater than 1 g/10 min at 230° C./2.16 kg.

* * * * *